United States Patent Office 2,702,959
Patented Mar. 1, 1955

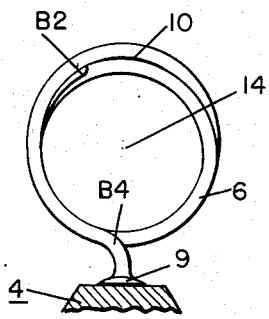
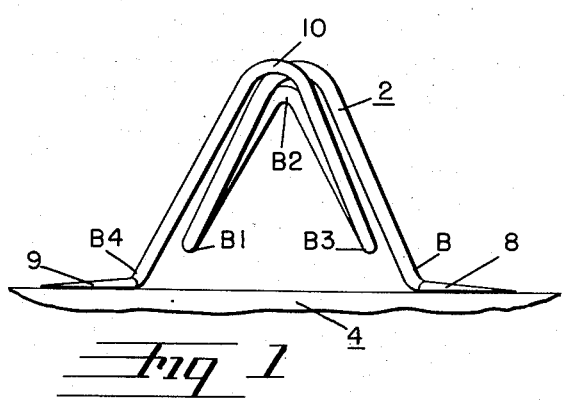
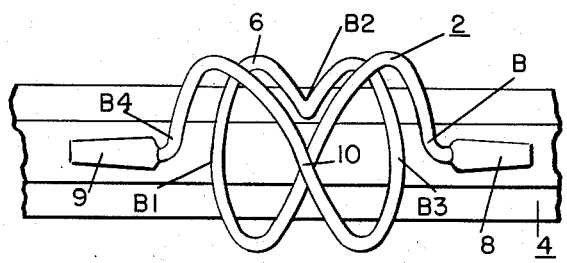
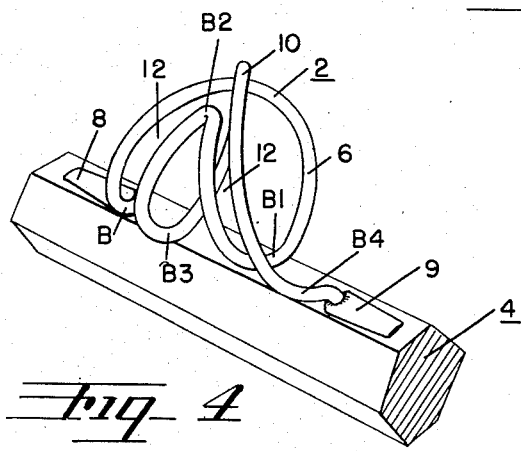

2,702,959
LINE GUIDE FOR FISHING RODS

Victor T. Wiglesworth, Portland, Oreg., assignor of two-and one-half per cent to Frank E. Schofield, Portland, Oreg.

Application February 12, 1952, Serial No. 271,083

3 Claims. (Cl. 43—24)

This invention relates to fishing rod lines guides; more particularly this improvement relates to wire wound guides constructed so as to provide sidewise line entry therein.

The primary object of this invention is to provide in a line guide a structure which will eliminate tangling of a whipping line around or within the guide.

Another object of the present invention is to provide the art with a device of the character mentioned, so wound as to allow expeditious threading or removal of a line within or without of said guide element.

Other objects and advantages of the present invention will be apparent from the following disclosure.

Referring to the accompanying drawings;

Figure 1 is a side elevation of my invention illustrating the guide in place on a fishing pole or like article.

Figure 2 is a front elevation of Figure 1.

Figure 3 is a plan view of my device as viewed from above.

Figure 4 is a perspective view of my device illustrating the side entry into my guide.

In the drawings which form a part of the present disclosure the numeral 2 shows my guide in place on a suitable fishing pole 4, being constructed of a single wire 6 of suitable size with reference to the intended use.

The guide is formed as shown in Figures 1 through 4 in the form of a double reverse overlap loop starting with one of the base ends 8 in which the wire is wound in a complete extended loop from B to B1, then reversing the direction of the loop to the point B2 the loop is again reversed to the point B3, and then from the point B3 in an extended loop from B3 to B4 overlapping the extended loop wind B—B1 and ending in the base 9.

By forming my guide in this manner it will be observed the portion adjacent point B2 converges in alignment between the loop B—B1 and the loop B3—B4 directly opposite and between the loops at the point 10 where B3—B4 overlaps the loop B—B1.

Between the portions B, 10 and B4 where portions B1 and B3 converge at B2 a space 12 is provided, for entry into the guide center 14, by passing a line around the portions B1—B3 toward the point B2 at the same time the line passing within the loop between the portions B—B4 and toward the point 10, and moving the line over the converging portions defining point B2 and under the point 10, entry may be made into the guide center 14; to remove the line from the guide the reverse of this operation is performed.

As illustrated in Figure 1 I have shown my guide formed as an inverted V converging adjacent the portion 10 at the top, and the bases 8 and 9 extending outward and drawn below the lower loop portions B1—B3.

By means of this construction two separate angular loops are formed whereby a whipping line has no corners or edges to catch, tangle or otherwise become fouled, eliminating these objectionable and well-known actions of the line during its travel through the guide eye.

It is obvious that line guides may be formed of various equivalents other than of a single wound wire; however, I believe that with a single wire the result is superior in many ways, though I do not limit myself to a single wire or strand thereof. By the term "wire" I do not limit myself to metals and alloys; indeed this invention may be fabricated of suitable plastics, certain durable ceramics and glass-like substances, as well as plastic and ceramic coated metal wire, and the like.

I claim:

1. A line guide for fishing rods comprising a wire member having straight coaxial ends extending away from each other, and an intermediate portion connecting the ends, said intermediate portion defining overlapping coils, and portions between the outer ends of the overlapping coils extending upwardly to form a V-shaped guide finger to direct the line into the space within the coils and between the coils.

2. A line guide for fishing rods comprising a rigid wire-wound element having straight coaxial ends extending away from one another, said ends being connected by an intermediate portion, the intermediate portion defining overlapping coils, and portions between the outer ends of the overlapping coils extending upwardly to form a substantially V-shaped guide finger adapted to direct the line into the space within the coils and between the coils.

3. A line guide for fishing rods comprising a wire member having straight coaxial ends extending away from each other, and overlapping intermediate portions connecting the said ends, said intermediate portions defining opposite wound overlapping coils elevated between the coaxial ends, coil portions extending upwardly to form a V-shaped guide finger to direct the line into the space within the coils and between the coils.

References Cited in the file of this patent
UNITED STATES PATENTS

| 754,094 | Roth | Mar. 8, 1904 |

FOREIGN PATENTS

| 99,156 | Germany | Sept. 22, 1898 |
| 921,474 | France | Jan. 13, 1947 |